US008737279B1

(12) United States Patent
Aweya et al.

(10) Patent No.: US 8,737,279 B1
(45) Date of Patent: May 27, 2014

(54) METHOD AND SYSTEM FOR WIRELESS LAN-BASED INDOOR POSITION LOCATION

(75) Inventors: James Aweya, Kanata (CA); Luis Orozco-Barbosa, Albacete (ES)

(73) Assignee: Avaya Inc., Basking Ridge, NJ (US)

( * ) Notice: Subject to any disclaimer, the term of this patent is extended or adjusted under 35 U.S.C. 154(b) by 80 days.

(21) Appl. No.: 13/431,423

(22) Filed: Mar. 27, 2012

Related U.S. Application Data

(63) Continuation of application No. 12/336,671, filed on Dec. 17, 2008, now Pat. No. 8,165,150.

(51) Int. Cl.
*H04B 7/00* (2006.01)

(52) U.S. Cl.
USPC .......................................... 370/310

(58) Field of Classification Search
USPC ................................ 370/310–350
See application file for complete search history.

(56) References Cited

U.S. PATENT DOCUMENTS

| | | | |
|---|---|---|---|
| 6,826,162 B2 | 11/2004 | Haines et al. | |
| 6,865,484 B2 * | 3/2005 | Miyasaka et al. | 701/470 |
| 7,085,588 B1 | 8/2006 | Pfister et al. | |
| 7,116,988 B2 | 10/2006 | Dietrich et al. | |
| 7,205,938 B2 | 4/2007 | Davi et al. | |
| 7,313,403 B2 | 12/2007 | Gong et al. | |
| 7,499,423 B1 * | 3/2009 | Amos et al. | 370/324 |
| 7,567,822 B2 * | 7/2009 | Hart et al. | 455/562.1 |
| 7,877,101 B1 * | 1/2011 | Chhabra | 455/456.3 |
| 7,907,579 B2 * | 3/2011 | FitzGerald | 370/338 |
| 8,165,150 B2 * | 4/2012 | Aweya et al. | 370/431 |
| 2004/0131032 A1 * | 7/2004 | Sendonaris et al. | 370/335 |
| 2004/0258012 A1 * | 12/2004 | Ishii | 370/328 |
| 2010/0020776 A1 * | 1/2010 | Youssef et al. | 370/338 |
| 2010/0150117 A1 * | 6/2010 | Aweya et al. | 370/338 |

* cited by examiner

*Primary Examiner* — Fan Ng
(74) *Attorney, Agent, or Firm* — Christopher & Weisberg, P.A.

(57) ABSTRACT

A method and system for position location of clients in wireless local area networks. (WLANs). The position location technique utilizes time-of-flight (TOF) measurements of signals transmitted from a client to a number of wireless access points (APs) or vice versa to determine distances. Round-trip time (RTT) measurement protocols are used to estimate TOF and distances between the client at an unknown position and the WLAN APs. The method and system improves positioning accuracy by identifying and mitigating non-line-of sight (NLOS) errors such as multipaths. Trilateration algorithms are utilized in combination with median filtering of measurements to accurately estimate the position of the client.

23 Claims, 12 Drawing Sheets

Condition for Collinearity of Three Points
$x_1(y_2 - y_3) + x_2(y_3 - y_1) + x_3(y_1 - y_2) = 0$

METHOD AND SYSTEM FOR WIRELESS LAN-BASED INDOOR POSITION LOCATION

CROSS-REFERENCE TO RELATED APPLICATION

This application is a continuation of patent application Ser. No. 12/336,671, filed Dec. 17, 2008, entitled METHOD AND SYSTEM FOR WIRELESS LAN-BASED INDOOR POSITION LOCATION, the entirety of which is incorporated herein by reference.

STATEMENT REGARDING FEDERALLY SPONSORED RESEARCH OR DEVELOPMENT n/a

FIELD OF THE INVENTION

The present invention relates generally to client locating systems and more specifically to a method and system for determining the location of clients in wireless local area network systems utilizing time-of-flight measurements of signals.

BACKGROUND OF THE INVENTION

Networks based on the IEEE 802.11 suite of protocols are affordable for most organizations and now ubiquitous in most metropolitan areas. The ubiquity of the IEEE 802.11 infrastructure also makes these technologies an attractive proposition for indoor locations. These technologies have been deployed indoors in small to large local environments such as cafes, hotels, malls, warehouses and factory floors, and in wider deployments such as university campuses, airports, train stations, public buildings, and hospitals. The ability to determine and track the physical location of wireless and tagged devices in the smaller and larger-scale wireless local area networks ("WLANs") leads to many interesting applications, particularly, with regard to the tracking of people, tagged assets, robots, and the like.

There is currently a growing interest in Location-Based Services ("LBS"). LBS are pervasive computing services that adapt to a user's location and situation. Location serves as a critical input for these applications. Pervasive computing represents the concept of "computing everywhere and anytime", making the computing technology details transparent to the users. Situation-awareness is a desirable and important feature of the systems in pervasive computing environments. A situation-aware system can sense the contexts, such as location, time, noise level, and available resources in order to recognize the current situation.

Context is any information that can be used to characterize the situation of an entity. An entity is a person, place, or object that is considered relevant to the interaction between a user and an application. An example of a context is a computing context, which includes network connectivity, communication costs, communication bandwidth, and nearby resources such as printers, displays and workstations. Other examples include user context (such as user profile, location, people nearby, or a current social situation), physical context (e.g., lighting, noise levels, traffic conditions and temperature), and time context (such as time of a day, season of the year, etc.).

Location is one of the most important and frequently used contexts. With LBS, an application determines the location of a client and shapes the information accordingly. Very often, where you are determines what you do. A worker in a company tends to eat in the cafeteria, conducts experiments in the lab, and does normal work and research at his or her desk. Applications can use this context to adapt behavior.

Indoor knowledge-based trips, such as visits to museums, art galleries and exhibitions, botanical gardens, and zoos are getting more popular. Handheld devices such as Personal Digital Assistants (PDAs) have become more functional and suitable to play the role of mobile learning platforms for multimedia applications. A PDA can display information on an exhibit in a museum or art gallery according to a visitor's current location. As a visitor walks up to a specific exhibit, the system retrieves the corresponding multimedia narration of that exhibit automatically.

Some other important examples of LBS are finding the location of particular persons or objects (for instance in case of emergency), tracking and watching of active badges or tags (for instance in high-security areas, airports, storage halls), child tracking, medical alert, inventory management, workforce management, navigation, lone worker monitoring, demand-responsive transport, etc. Another interesting application is to accurately determine the position of a client in a WLAN as a basis for applying new techniques for access control and system security.

A security architecture can use such location information to offer services such as position based access policies, and Virtual LANs (VLANs). Another example application is Conference Assistant, which matches conference schedules, topics of presentations, user's location, and user's research interests to suggest the presentations to attend. This can be extended to other reminder services. Another example is Call Forwarding where the location context is determined and the phone calls to the destination user's nearest phone. Finally, Teleporting relates to "Follow me" computing where the user interface is dynamically mapped onto the resources of the surrounding computer and communication facilities.

Systems specifically oriented towards positioning and navigation (i.e., Global Positioning System ("GPS") or Galileo systems) and location systems which operate over cellular networks like Global System for Mobile communication ("GSM") and Universal Mobile Telecommunication System ("UMTS") already exists. However, these systems do not work properly and/or suffer from large location errors when used indoors. In particular, difficulties with GPS positioning usually occur in urban canyons (city cores) and indoors, where it is difficult or impossible to acquire the necessary number of satellites for a position computation. GPS receivers require an unobstructed view of the sky, so they are used only outdoors and they often do not perform well within forested areas or near tall buildings. Positioning becomes more difficult at medium- to deep-indoors, electrically noisy indoor scenarios, subterranean places like underground parking, etc. Since these locations systems are inefficient for indoor environments, alternative positioning technologies are required. To date the solutions proposed for indoor environments have not been particularly accurate. Current wireless LAN-based location systems suffer from the noisy characteristics of the wireless channel and multipath distortion. As a result, the time-of-flight ("TOF") is highly variant due to the impact of multipath errors.

Most of the location techniques used in wireless environments are based on received signal strength ("RSS"), angle-of arrival ("AOS"), time-of-arrival ("TOA"), and time-difference-of arrival ("TDOA") methods. All of these methods require line-of-sight ("LOS") communication paths. Unfortunately, in real networks, such direct paths rarely exist. Quite often, the signal received is either a combination of the LOS signal and multipath signals or consists of only multipath signals. In either case, there exist so-called non-line-of-sight ("NLOS") propagation errors which tend to be the dominant error component when compared to receiver noise. In particular, NLOS errors tend to be very large in wireless indoor locations systems, and hence dramatically degrade positioning accuracy. As a result, these errors must be mitigated when determining the position of clients in wireless indoor environments. NLOS error mitigation techniques must be applied in the location process to remove or minimize the deleterious effects of these errors on positioning accuracies Systems specifically oriented towards positioning and navigation (i.e., GPS or Galileo systems) and location systems which operate over cellular networks like GSM and UMTS already exist. However, these systems do not work properly and/or suffer from large location errors when used indoors. In particular, difficulties with GPS positioning usually occur in urban canyons (city cores) and indoors, where it is difficult or impossible to acquire the necessary number of satellites for a position computation. GPS receivers require an unobstructed view of the sky, so they are used only outdoors and they often do not perform well within forested areas or near tall buildings. Positioning becomes more difficult at medium- to deep-indoors, electrically noisy indoor scenarios, subterranean places like underground parking, etc. Since these locations systems are inefficient for indoor environments, alternative positioning technologies are required. To date, the solutions proposed for indoor environments have not been particularly accurate. Current wireless LAN-based location systems suffer from the noisy characteristics of the wireless channel and multipath distortion, and the TOF is highly variant due to the impact of multipath errors Therefore, what is needed is a system and method for the indoor position location of clients in WLANs that do not suffer from the above-described problems.

SUMMARY OF THE INVENTION

The present invention advantageously provides a method and system for determining the location of clients in a wireless local area network via the use of ranging protocols to obtain time-of-flight measurements, non-line-of-sight mitigation techniques and trilateration algorithms.

In one aspect of the invention, a system for determining a location of a client in a local area network is provided. The local area network includes one or more access points in communication with the client. The system includes a ranging subsystem for determining estimated distances between the client and the one or more access points, where each of the one or more access points has a known position. The system also includes a positioning subsystem for determining the location of the client utilizing the estimated distance between the client and the one or more access points and the known position of the one or more access points, where the positioning subsystem includes at least one virtual reference station, where the at least one virtual reference station is used to determine the location of the client.

In another aspect of the invention, a method of determining a location of a client in a local area network is provided, where the local area network includes one or more access points in communication with the client. Each of the one or more access points has a predetermined location. The method includes receiving, from the one or more access points, ranging protocol signals used to estimate distances from each access point to the client, where at least one of the access points is designated as a virtual reference station used to estimate the distances from each access point to the client. The method also includes calculating the location of the client based on the estimated distances from each access point to the client and the position of each access point.

In yet another aspect of the invention, a location management station for determining a location of a client in a local area network having one or more access points is provided. Each of the one or more access points has a predetermined position. The station includes an interface module adapted to receive, from the one or more access points, signals representing estimated distances from each access point to the client, where at least one of the access points is designated as a virtual reference station used to estimate the distances from each access point to the client. The location management station also includes a processor for calculating the location of the client based on the estimated distances from each access point to the client and the position of each access point.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
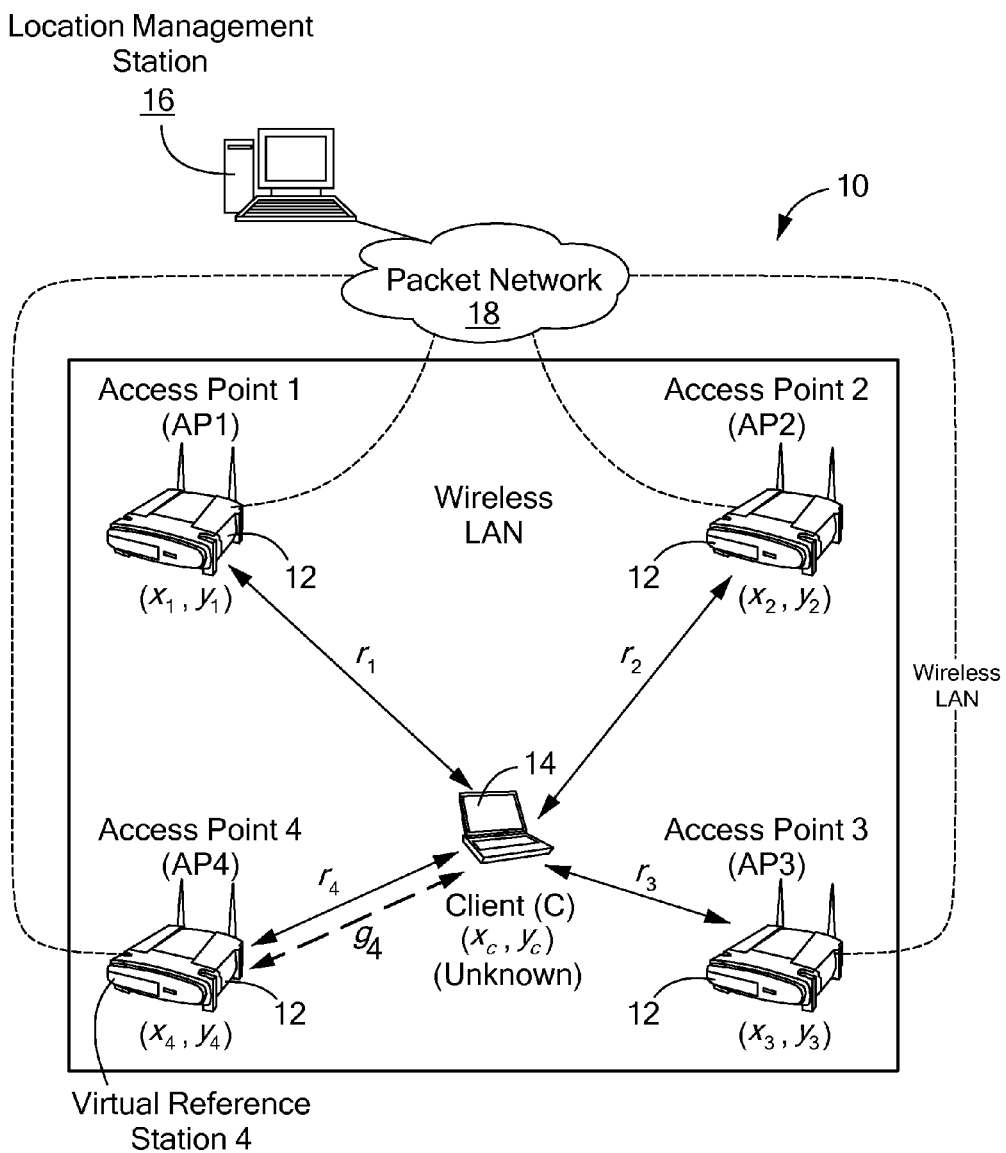
FIG. 1 is a block diagram of an exemplary client position location system using a location management station and constructed in accordance with the principles of the present invention.

Before describing in detail exemplary embodiments that are in accordance with the present invention, it is noted that the embodiments reside primarily in combinations of apparatus components and processing steps related to implementing a system and method for locating a client in a local area network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for indoor position location of clients in wireless local area networks ("WLANs"). The position location method of the present invention utilizes the time-of-flight ("TOF") measurements of signals transmitted from a client to a number of wireless access points ("APs") or vice versa to determine distances. Round-trip time ("RTT") measurement protocols (also called "ranging protocols") are used to estimate TOF and distances between the client at an unknown position and the WLAN APs. In wireless indoor location, non-line-of sight ("NLOS") errors such as multi-paths are major location error sources. Thus, to improve positioning accuracy, these errors must be identified and mitigated. In the present invention, trilateration methods are utilized in combination with median filtering of measurements to accurately estimate the position of the client.

Advantageously, the invention provides the concept of Virtual Reference Stations ("VRSs"), whereby at any given instance of applying trilateration there is an AP in the WLAN that assumes the role of a temporary reference station and is not involved in the trilateration process. Trilateration uses a minimum of three APs to compute the location of the client on a two-dimensional plane. VRSs together with trilateration and median filtering allow for the mitigation of the undesirable effects of indoor NLOS errors on the accuracy of the of the ranging protocol and TOF estimation between the client and the APs The present invention provides a WLAN location technique based on distance computations provided by TOF measurements. These measurements are, in turn, obtained from RTT ranging protocol measurements between the client, whose location is to be determined, and the WLAN APs. The invention is divided into two subsystems, one being a ranging subsystem, and the other being a positioning subsystem. The ranging subsystem estimates the distance between the client and the APs, and the positioning subsystem calculates the client's position using the distances already estimated and the APs' known positions. TOF measurements require precise knowledge of the signal transmission start time at the sender and time of arrival ("TOA") at the receiver. The TOF measurements are sensitive to multipath conditions of the indoor radio channel between the AP and the client. Since the TOF needed to estimate the true distance is associated with the signal (amongst all the multipath signals) arriving through the direct LOS, TOF estimation would be inaccurate if obtained from signals following other paths. Hence, in order to mitigate the deleterious effects of multipath signals on TOF estimation, the present invention advantageously incorporates the concept of a Virtual Reference Station ("VRS").

At any given instance in the trilateration process, a VRS is an AP in the WLAN that assumes the role of a temporary reference station and is not involved in the trilateration process. VRS is used together with trilateration and median filtering of measurements to determine the position of the client. This technique allows for the minimization of the TOF estimation error due to multipath signals. With a number of VRSs in an instance of trilateration, the invention provides the ability to identify and remove NLOS errors before measurements are used in the position computations. The proposed NLOS mitigation method depends on system redundancy or high client-AP hearability (i.e., high number of APs) such that the greater the number of APs deployed in the system, the higher the number of NLOS errors that can be detected and mitigated.

The method assumes that the number of distance measurements or equivalently, number of APs, is greater than the minimum number required for trilateration, which is three, for client location in a two-dimensional plane. This serves to provide the necessary system redundancy such that the present invention is capable of mitigating the NLOS errors in location estimation even when the distance (or range) measurements corrupted by NLOS errors are not directly identifiable.

Figure 2:
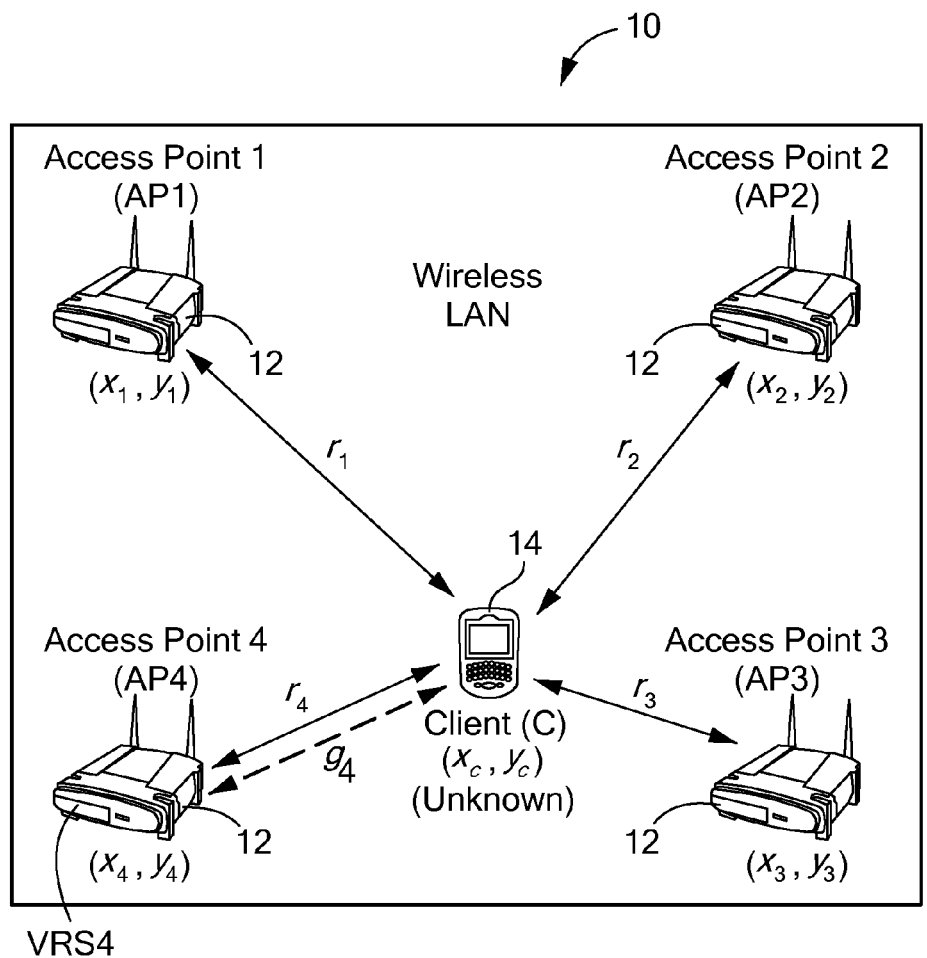
FIG. 2 is a is a block diagram of an exemplary client position location system using self localization and constructed in accordance with the principles of the present invention

Referring now to the drawing figures in which like reference designators refer to like elements there is shown in FIG. 1 a location system constructed in accordance with the principles of the present invention and designated generally as "10". System 10 is a network with access points ("APs") 12 and a client 14 at an unknown position. APs 12 are devices that allow for wireless devices to communicate with each other by acting as both a transmitter and receiver of WLAN radio signals. APs 12 are dedicated hardware devices that include a built-in network adapter, antenna, and radio transmitter. In one embodiment, there are at least three APs 12 (AP1 through AP4), that receive signals from a client 14 that is at an unknown location. It is assumed that APs 12 are preferably placed in a non-collinear fashion and the location of the APs 12 are known (as depicted in FIGS. 1 and 2).

FIG. 1 illustrates an exemplary embodiment where a location management station ("LMS") 16 is in electronic communication with the APs 12 over a packet network 18 and where LMS 16 calculates the location of client. The LMS 16 includes an interface module that receives signals from each AP 12 representing the AP's estimated distance to client 14 and a processor that calculates the location of client 14 based on the received estimated distances from each AP 12 to client 14 and the known position of each AP 12. LMS 16 also includes the necessary hardware and software to allow it to transmit and receive signals representing the location of client 12 to and from outside entities upon request. Each AP 12 each listens to signals from client 14 in order to generate a time of flight ("TOF") between the AP 12 and the client 14. The TOF is then used to generate a set of distances between the APs 12 and client 14. Each AP 12 then forwards its distance measurement for a particular client 12 to a LMS 16 over network 18. LMS 16 performs a method stored in its memory in order to determine the actual location of client 14.

In FIG. 1, it is assumed that an NLOS error results from the blockage of the direct signal and the reflection of multipath signals. The NLOS error is the extra distance that a signal travels from the transmitter to receiver and, as such, always has a nonnegative value. Referring to FIG. 1, LMS 16 retrieves measurement data from each of the APs 12, where all measurements from the APs 12 are sent to LMS 16 for further processing and analysis. LMS 16 also calculates mobile positions from the measurement data by using measurements from APs 12 and their known locations. The LMS 16 then calculates the position of client. 14. LMS 16 also administers and controls location system 10. For example, in the mobile networking case, the LMS 16 sends the client's position to gateway mobile location centers for distribution to applications/servers for location-based mobile services. LMS 16 also manages communications between the location system 10 and external entities such as gateway mobile location centers and network operations centers. In addition to calculating mobile positions, LMS 16 also manages, coordinates, and administers the location system 10 and provides interfaces to external entities such as network operations and administration centers/systems.

In one embodiment of location system 10, a location activity is initiated by an application external to the location system 10 itself. For example, a gateway mobile location center, in response to an application's request for a location, screens the request and forwards it through the network to LMS 16. Similarly, at the end of the location process, LMS 16 sends the calculated client's position information through a gateway mobile location center to an external entity, typically the application that initiated the location activity or, in the case of public safety locations, to the appropriate emergency service center/public safety answering point.

One building block of a location system is ranging, the process of estimating the distance between a pair of nodes. The present invention incorporates TOF ranging. TOF uses the absolute time it takes for a signal to travel from client 14 to an AP 12. An AP 12 then uses the TOF to calculate the distance between the client 14 and the AP 12. Signals travel with a known velocity (i.e., speed of light), so the distance can be directly calculated from the TOF and the velocity of the signal. TOF measurements require accurate time synchronization to accurately measure TOF. Time synchronization is required both at the APs 12 and the client 14. This is because TOF measurements require precise knowledge of the signal transmission start time at the sender and time of arrival at the receiver, thus requiring that all receiving APs 12 as well as client 14 be accurately synchronized with a precise time source. In the case where the devices are not synchronized to a common reference, then the mis-synchronization has to be determined and removed before location computation.

Nodes that run ranging protocols typically function by exchanging request ("RQ") and response ("RP") messages, computing round-trip time using multiple timestamps, estimating one-way time delay (TOF) and converting into distance assuming path symmetry, and minimizing end-system software stack effects on ranging by using hardware timestamping. If timestamping is performed in the application layer, interrupts and other unpredictable software processes can introduce jitter and latency which in turn may impair the ranging accuracy. Even the use of precise external oscillators would not overcome the stack jitter associated with a software-only implementation. Most applications require the higher accuracy achieved by timestamping packets at the interface between the physical ("PHY") and data link ("MAC") layers (often referred to as "hardware timestamping").

Figure 3:
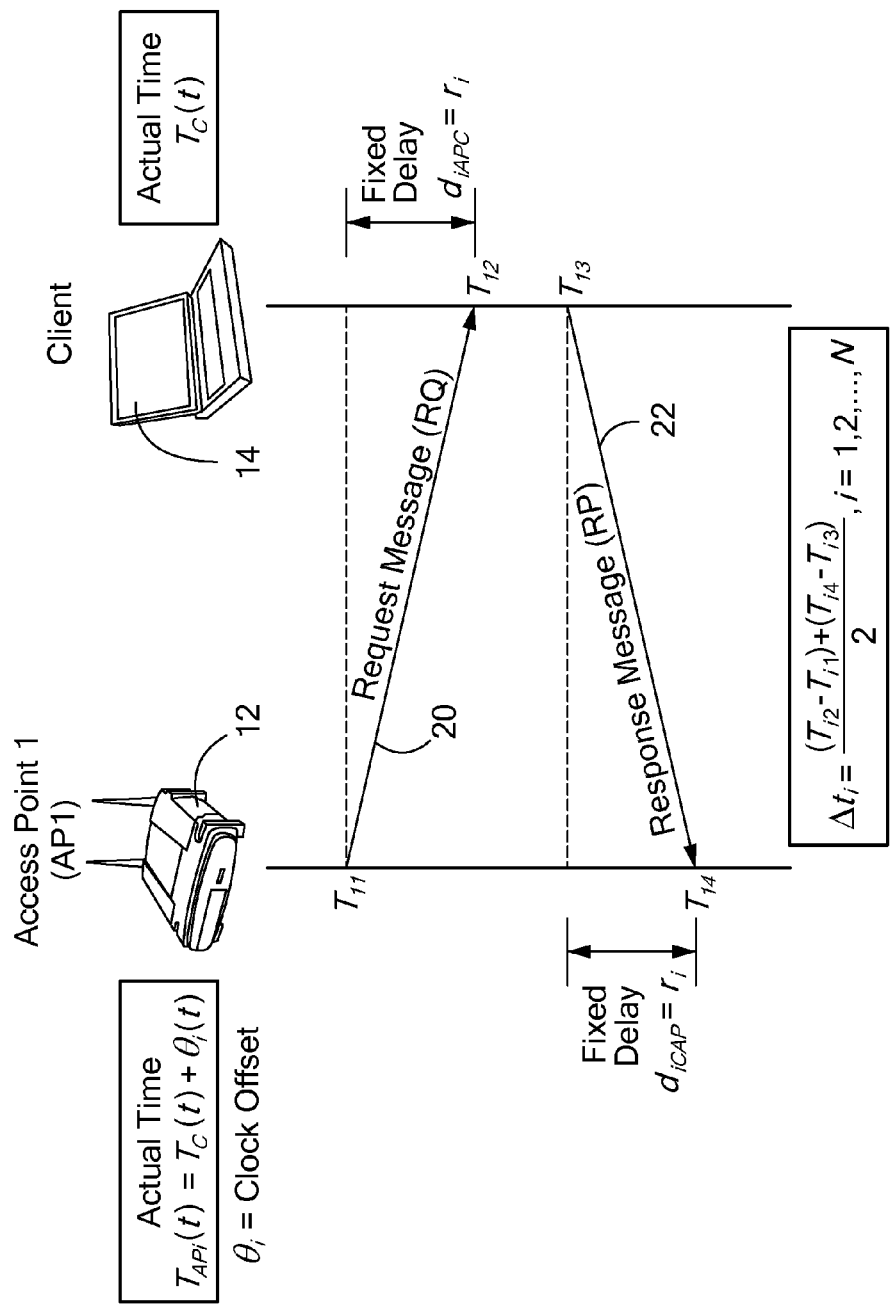
FIG. 3 is a graphical representation of a two-way ranging protocol used in accordance with the principles of the present invention.

Some of the following ranging protocols can be used for time synchronization since they produce both delay (i.e., distance) and time offsets. FIG. 3 illustrates one embodiment where a two-way ranging protocol is used. This protocol forms the basis for ranging in the Network Time Protocol ("NTP") and IEEE 1588 Precision Time Protocol ("PTP"). The underlying assumption of these protocols is that both forward and reverse paths of the client-server communication are symmetric and have a fixed communication delay. The basic principle for computing the delay $d_{iAPC}=d_{icAP}=\Delta t_i$ between the client 14 and an AP 12 can be seen in FIG. 3. AP 12 initially sends a request message 20 to client 14 that contains the timestamp $T_{i1}$ that the message is sent. Client 14 notes the time it receives this message as $T_{i2}$ and, at a later time, sends a response message 22 back to AP 12 containing the time $T_{i1}$, which is the time AP 12 sent the request message 20, the time $T_{i2}$, which is the time client 14 received message 20, and the time $T_{i3}$ that represents the time the client 14 sends the response message 22. The AP 12 notes the time it receives message 22 as $T_{i4}$. Under the assumption that the delays for the two paths are symmetric, the following relationships can be derived:

$$T_{i2}=T_{i1}-\theta_i+\Delta t_i$$

$$T_{i4}=T_{i3}+\theta_i+\Delta t_i$$

From these equations, the AP 12 computes the fixed delay $\Delta t_i$ and clock offset $\theta_i$, as follows:

$$\Delta t_i = \frac{(T_{i2} - T_{i1}) + (T_{i4} - T_{i3})}{2}$$

$$\theta_i = \frac{(T_{i2} - T_{i1}) - (T_{i4} - T_{i3})}{2}$$

The clock offset $\theta_i$ can be used to remove any missynchronization in the case of unsynchronized devices.

Another exemplary ranging protocol that is used with the location system 10 of the present invention is an IEEE 802.1AS ranging protocol. This protocol, illustrated in FIG. 4, is particularly suited for wireless environment such as the IEEE 802.11 because it has request, acknowledgment, and follow-up messages to handle the media contention behavior of such protocols which often lead to collisions and packet losses.

Figure 4:
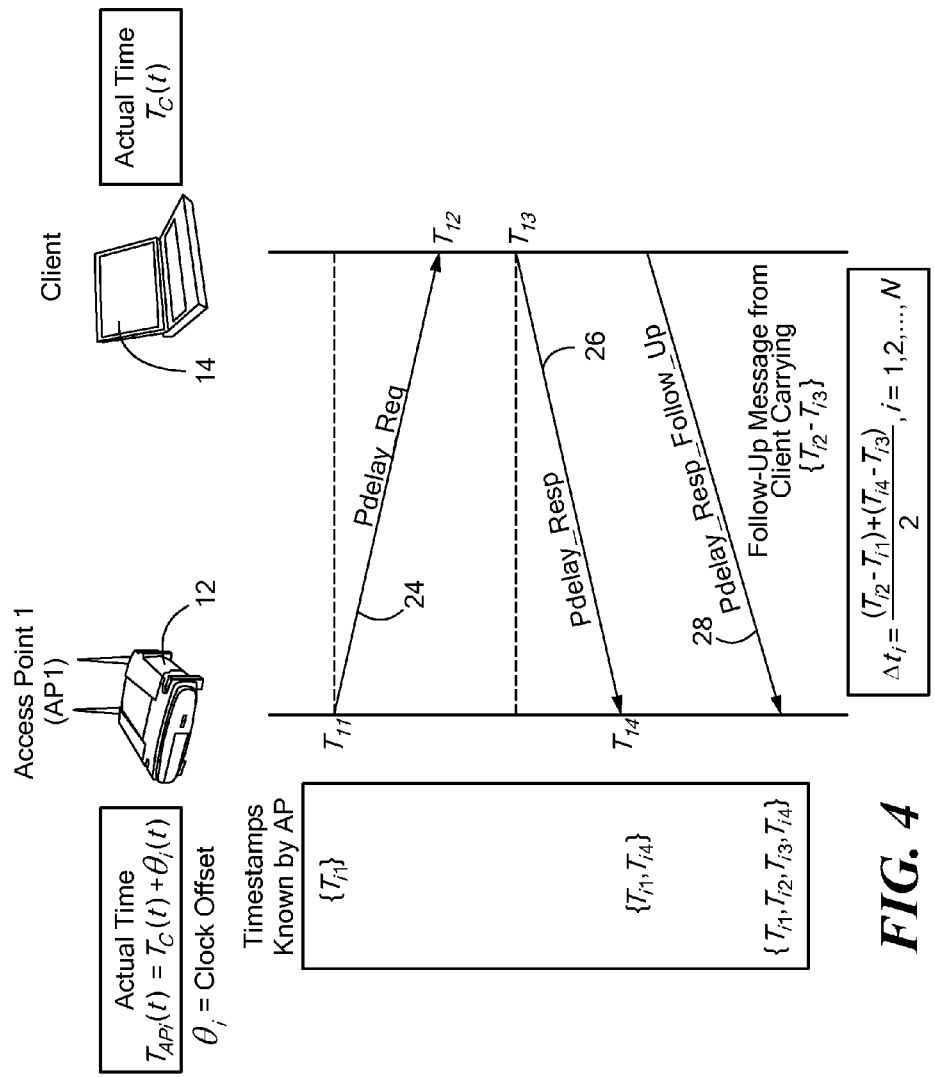
FIG. 4 is a graphical representation of an alternate ranging protocol used in accordance with the principles of the present invention.

In the embodiment shown in FIG. 4, an AP 12 schedules a request message (Pdelay_Req) 24 for transmission. As request 24 passes through the physical layer (PHY), timestamp $T_{i1}$ is captured using the AP clock. Timestamp $T_{i2}$ is also captured in the PHY as the message 24 is being received at the client 14. The client MAC protocol responds with an acknowledgment message (Pdelay_Resp) 26 to the AP at time $T_{i3}$. The arrival time of message 26 is captured by the AP 12 as $T_{i4}$. A follow-up message (Pdelay_Resp_Follow_Up) 28 is then sent by the client 14 to the AP 12 carrying the timestamps $\{T_{i2},T_{i3}\}$ captured by the client 14. Using the timestamps obtained, the AP 12 calculates the fixed delay $\Delta t_i$ as shown above in the discussion relating to FIG. 3.

Figure 5:
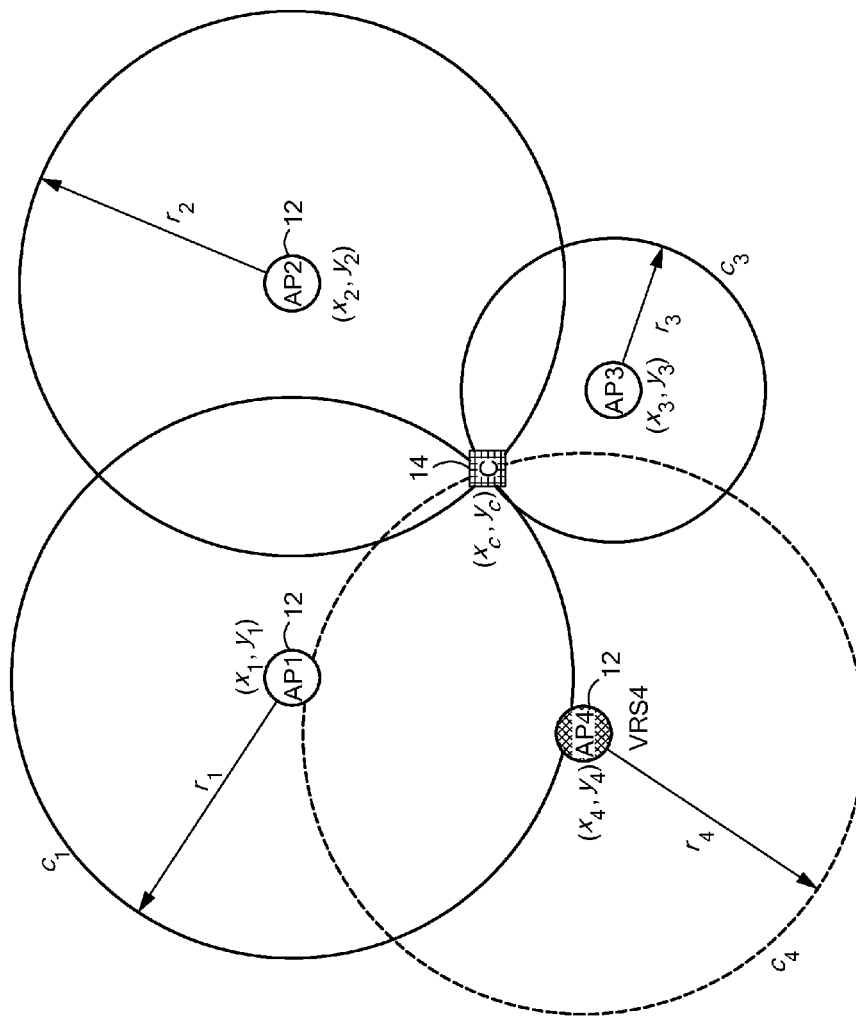
FIG. 5 illustrates the use of trilateration as a client positioning technique used in accordance with the principles of the present invention.

After obtaining range measurements (i.e., distances), the positioning of client 14 is determined using these measurements. One method that can be used with TOF estimates is trilateration. Trilateration uses the known locations of three or more APs 12, and the measured distance between the client 14 and each AP 12 to determine the relative location of the client 14. When the distance between client 14 and the three APs 12 are known, the client's location on a two-dimensional plane can be computed as the intersection of three circles as can be seen in FIG. 5.

In trilateration, the area of client position uncertainty is relatively small if there are no NLOS errors. In other words, the intersection of circles is concentrated near the true client location, as shown in FIG. 5. In contrast, the area of uncertainty is large if any AP 12 suffers from NLOS errors. When the LOS signal of an AP 12 is blocked, the TOF measurements related to this AP 12 will have a bias equal to the NLOS error and the associated circles will move away from the true client location. Consequently, the intersections between these shifted circles and other circles will also move away from the true MS location, enlarging the area of uncertainty.

The NLOS-error mitigation algorithms utilized by the present invention explore different possibilities of NLOS-free intersections ("clean" intersections) and NLOS-corrupted intersections ("biased" intersections). If the system redundancy is sufficiently high (i.e., a higher number of APs 12 or equivalently, high AP-client hearability) and only a small number of measurements contain NLOS errors, then the result is that more clean intersections will exist near the true client position. Therefore, a higher intersection density exists near the true client position. By searching the different intersection possibilities, an intermediate estimate of the client position $P_c=(x_c, y_c)$ can be obtained from which NLOS errors can be identified and mitigated, and a final client location $P_{client}=(x_l, y_l)$ determined.

Figure 6:
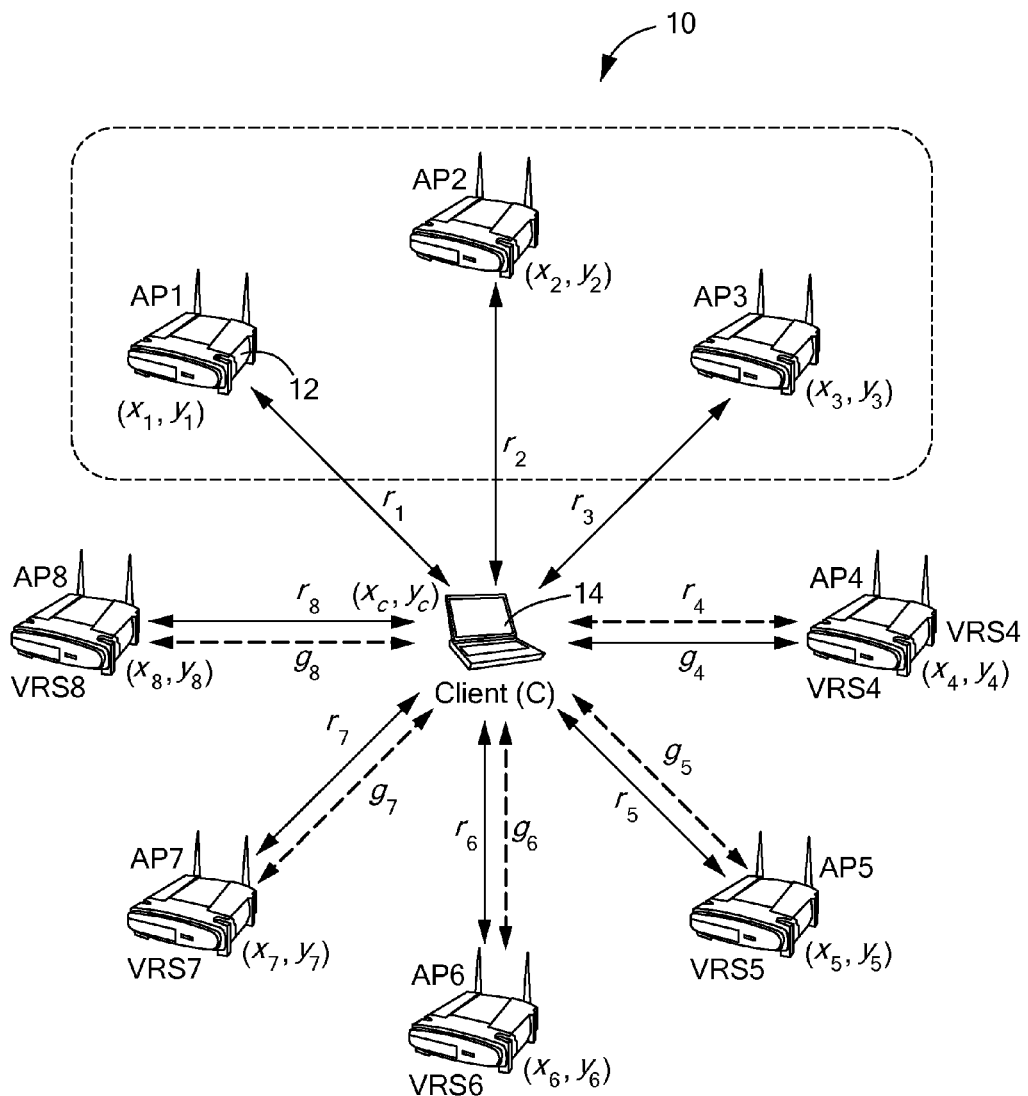
FIG. 6 illustrates the use of virtual reference stations as a client positioning technique.

FIG. 6 illustrates the use of a Virtual Reference Station ("VRS") in location system 10 of the present invention. A VRS is an AP in the WLAN that assumes the role of a temporary reference station and is not involved in the trilateration process. A grouping of N APs 12 in a WLAN system is shown in FIG. 6. In order to locate a particular client 14, each AP 12 performs a distance measurement to client 14. The distance measurement performed by APi, which is located at $(x_i, y_i)$, is represented by $r_i$. Since a minimum of three AP measurements are needed for trilateration (as shown by the dashed lines), L subsets of measurements are created, each of which contains three distances:

$$L = \binom{N}{3} = \frac{N!}{3!(N-3)!}$$

Subsets that cannot be used in the trilateration are excluded leaving M subsets. For each one of the M subsets, the three distances and trilateration are used to compute the intermediate client location $P_c=(x_c, y_c)$. One aspect of the location technique of the present invention is the use of virtual reference stations ("VRSs") as shown FIGS. 1, 2 and 6. For each one of the M subsets, there are (N-3) VRSs. For each one of the VRSs and its associated subset, a square-of-location-error (SLE) is computed as follows:

$$SLE_j = \|g_j - r_j\|^2, j=1, 2, \ldots, (N-3),$$

where $$g_j = \sqrt{(x_c - x_j)^2 + (y_c - y_j)^2},$$

is the distance between the client intermediate location $P_c = (x_c, y_c)$ and a VRS j at $(x_j, y_j)$, j=1, 2, . . . , (N-3). The SLE is considered a residual of the intermediate location estimate. When ideal conditions exist and there are no measurement errors and client 14 is at its true location, then the residue SLE is zero. However, in practice, the set of measurements $r_i$, i=1, 2, . . . , N, contain some errors, such that the SLE would typically not be zero.

The sources of errors can be categorized as systematic, such as those related to mis-synchronization between transmitter and receiver, and channel-related, such as those due to NLOS channel conditions. In reality, the systematic errors in the distance measurements tend to be smaller making the dominant source of errors to be channel-related. As discussed above, NLOS channel conditions generally result in the strongest signal being received with longer delay, with the resulting distance measurement being longer than it should be. As discussed below, a final location solution $P_{client}=(x_l, y_l)$ can be found that minimizes the median of the SLE computations.

Since NLOS channel conditions introduce errors that are strictly positive, distance measurements corrupted by NLOS errors would give rise to location estimates with higher SLEs than would be the case with no NLOS errors. Therefore, if the number of distance measurements is greater than the minimum required (which for trilateration is three), then the distance measurements can be group into subsets, each subset with its associated VRSs, and intermediate location estimates and SLEs derived for these subsets. Some of the intermediate estimates would have lower SLEs than others. By deriving the median of the SLEs within each subset and VRSs, the final estimate of the location, $P_{client}=(x_l, y_l)$ can then be formed as a linear weighting of the intermediate estimates $P_c=(x_c, y_c)$.

Advantageously, other than a higher system redundancy (higher number of APs), the present invention requires no statistical models or prior information on the LOS-NLOS channel conditions. The only requirement is that the number of range measurements, that is, number of APs 12, has to be greater than the minimum required for trilateration (which is three). This requirement provides freedom in performing various combinations of range measurements. For example, if there are N>3 range measurements, each from a different AP 12, the range measurements can be grouped in a number of ways subject to the constraint that the number of range measurements in each group be no less than 3. For example, if N=5, there are ten eligible range measurement combinations with each combination having N-3=2 VRSs. Applying trilateration to these combinations yields ten intermediate client location estimates $P_c=(x_c, y_c)$. Some of these groups will contain no NLOS errors or less NLOS errors than the others. When there is an NLOS error in a data set, the SLE of the estimate is likely to be greater than the SLE when there is no NLOS error. Reliance on the estimates derived from the "clean" groups will result in the reduction of NLOS errors. Since the SLE is an indicator in evaluating the quality of an estimate, the estimate $P_c=(x_c, y_c)$ can be weighted based on the inverse of its associated SLE. Appropriately, each weight is normalized by the sum of the inverse SLEs. The final location estimate $P_{client}=(x_l, y_l)$ is a linear combination of the intermediate location estimates $P_c=(x_c, y_c)$ weighted inversely to their normalized SLEs. By doing this, the location algorithm automatically suppresses NLOS errors in the final location estimate, and thereby achieves the goal of NLOS error mitigation.

Figure 7:
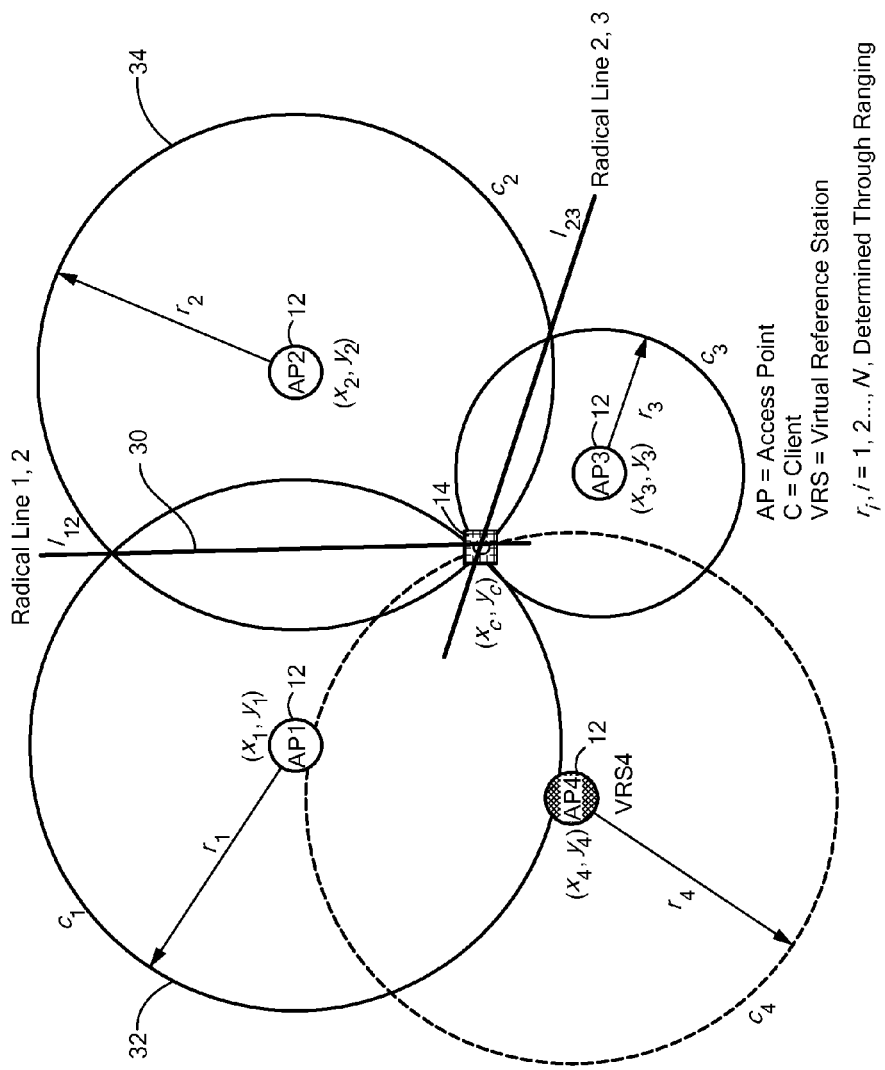
FIG. 7 illustrates the technique of trilateration and radical lines in determining the client position.

Referring to FIG. 7, a line 30 joining the two intersecting points of the two circles, called a "radical line", can be used to accurately locate the client 14. The radical line 30, also called the "radical axis", is the locus of points of equal circle power with respect to two non-concentric circles 32 and 34. By the chordal theorem, radical line 30 is perpendicular to the line of centers. If the circles have radii $r_1$ and $r_2$, then their centers are separated by a distance d. If the circles intersect in two points, then the radical line 30 is the line passing through the points of intersection.

Figure 8:
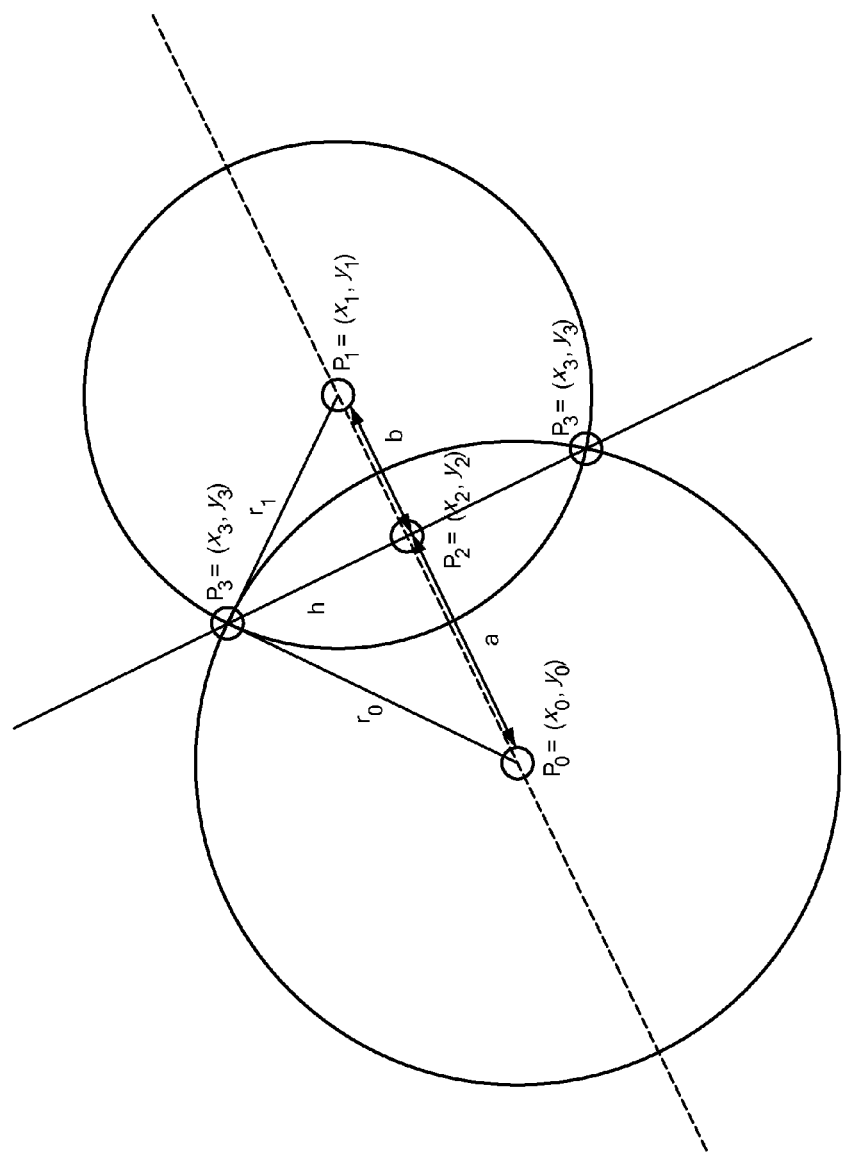
FIG. 8 illustrates the intersection of two circles and the formation of a radical line.

If two circles do actually intersect, then the two points of intersection can be identified as $P_3=(x_3, y_3)$ as shown in FIG. 8. $P_0=(x_0, y_0)$ represents the center of circle $C_0$ with radius $r_0$ and $P_1=(x_1, y_1)$ represents the center of circle $C_1$ with radius $r_1$. From the two triangles $P_0P_2P_3$ and $P_1P_2P_3$ in FIG. 8, the following expressions can be derived:

$$a^2 + h^2 = r_0^2$$

$$b^2 + h^2 = r_1^2$$

Noting from FIG. 8 that d=a+b, a can be derived for as follows:

$$a = \frac{(r_0^2 - r_1^2 + d^2)}{2d},$$

from which it is seen that $a=r_0$, that is, a reduces to $r_0$ when the two circles touch at one point, i.e., $d=r_0+r_1$. Alternatively, knowing the points $P_0=(x_0, y_0)$ and $P_1=(x_1, y_1)$, d can be obtained as $d=\sqrt{(x_1-x_0)^2+(y_1-y_0)^2}$. Substituting a into the first equation, h can be derived by $$h=\sqrt{r_0^2-a^2}=\sqrt{(r_0+a)(r_0-a)}$$

From, FIG. 8, $$P_2 = P_0 + \frac{a(P_1 - P_0)}{d}$$

from which two intersection points of two non-concentric circles are derived as:

$$x_3 = x_2 \pm \frac{h(y_1 - y_0)}{d}$$

$$y_3 = y_2 \mp \frac{h(x_1 - x_0)}{d}$$

which can also be expressed as:

$$x_{31} = x_2 + \frac{h(y_1 - y_0)}{d}$$

$$y_{31} = y_2 - \frac{h(x_1 - x_0)}{d}$$

and $$x_{32} = x_2 - \frac{h(y_1 - y_0)}{d}$$

$$y_{32} = y_2 + \frac{h(x_1 - x_0)}{d}$$

Figure 9:
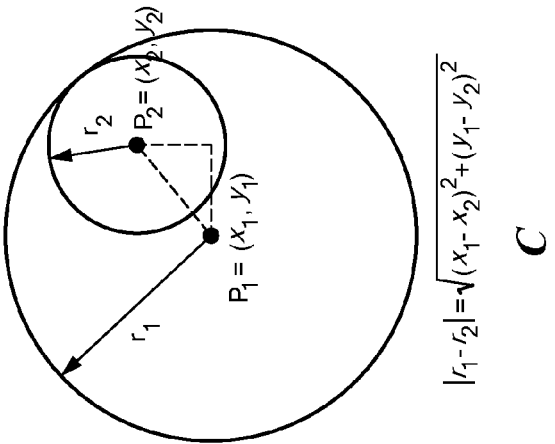
FIG. 9 illustrates examples of where two circles do not intersect to form a radical line and where trilateration methods would not be effective.
Figure 9:
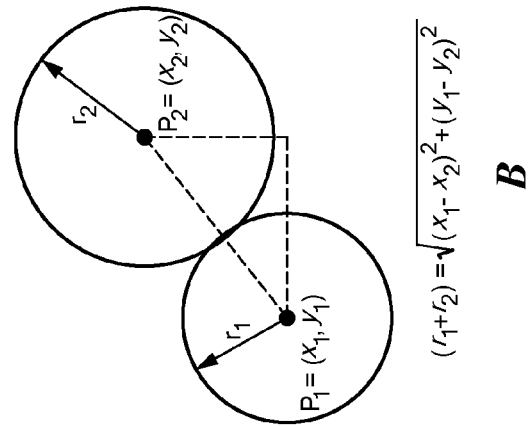
Figure 9:
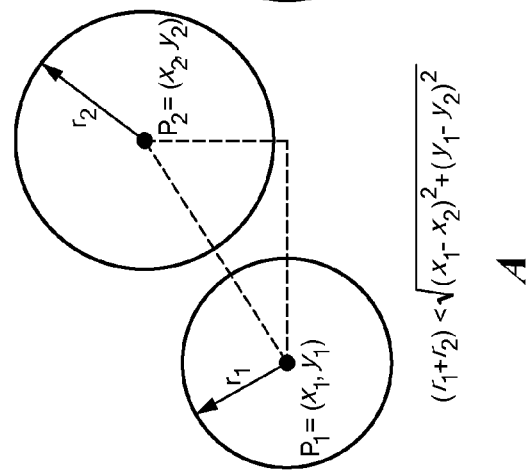

From results above, for two circles, $C_0$ with center at $P_0=(x_0, y_0)$ and radius of $r_0$, and $C_1$ with center at $P_1=(x_1, y_1)$ and radius of $r_1$, the following can be observed:
1. if $r_0+r_1<d$, then the circles are separate, resulting in no intersection (as shown in FIG. 9)
2. if $r_0+r_1=d=\sqrt{(x_0-x_1)^2+(y_0-y_1)^2}$, then the circles just touch each other (as shown in FIG. 9).
3. if $|r_0-r_1|>d$, then one circle is contained within the other, also resulting in no intersection (as shown in FIG. 9).
4. if $r_0+r_1>d=\sqrt{(x_0-x_1)^2+(y_0-y_1)^2}$, then the circles intersect (as shown in FIG. 8).

Circles satisfying conditions 1 to 3 above are not used in the trilateration. The present invention contemplates the use of circles satisfying condition 4 above.

Figure 10:
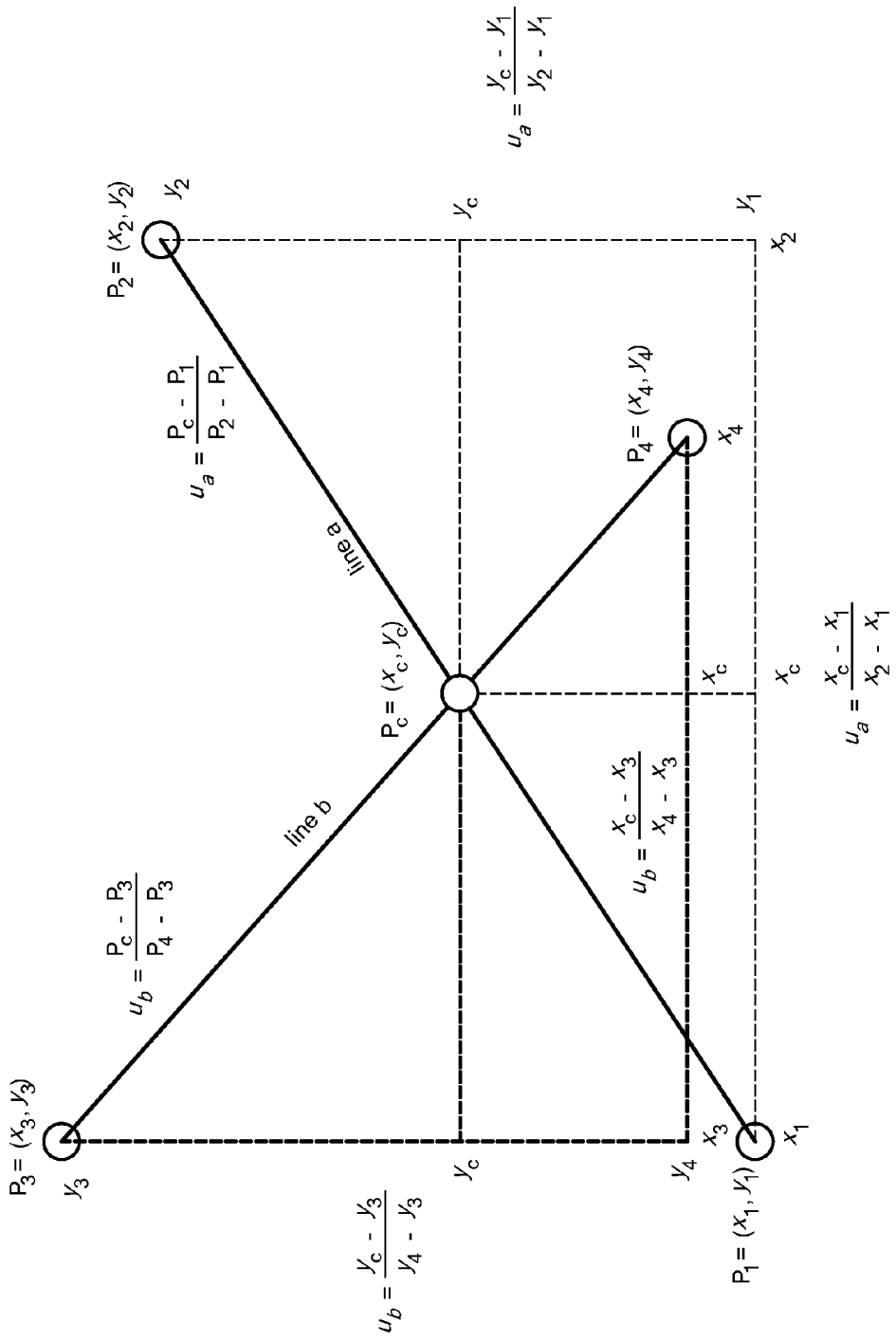
FIG. 10 is a graphical representation illustrating the intersection of two lines as representing the client location.

The location system 10 of the present invention utilizes the concept of the point of intersection of two lines in order to pin-point the location of client 14. The following describes an exemplary method that determines the point of intersection of two lines. Referring to FIG. 10, the equations of lines a and b can be represented, respectively as:

$$P_a=P_1+u_a(P_2-P_1)$$

$$P_b=P_3+u_b(P_4-P_3)$$

By setting $P_a=P_b=P$, the following two equations with the two unknowns $u_a$ and $u_b$ can be derived:

$$x_1+u_a(x_2-x_1)=x_3+u_b(x_4-x_3)$$

$$y_1+u_a(y_2-y_1)=y_3+u_b(y_4-y_3)$$

where $P_1=(x_1, y_1)=P$ and $P_2=(x_2, y_2)$ are the two points on line a, and $P_3=(x_3, y_3)$ and $P_4=(x_4, y_4)$ are the two points on line b. These two equations are solved to obtain the following expressions for $u_a$ and $u_b$:

$$u_a = \frac{(x_4 - x_3)(y_1 - y_3) - (y_4 - y_3)(x_1 - x_3)}{(y_4 - y_3)(x_2 - x_1) - (x_4 - x_3)(y_2 - y_1)}$$

$$u_b = \frac{(x_2 - x_1)(y_1 - y_3) - (y_2 - y_1)(x_1 - x_3)}{(y_4 - y_3)(x_2 - x_1) - (x_4 - x_3)(y_2 - y_1)}$$

From FIG. 10, the point of intersection, $P=(x, y)$, of the two lines can be expressed by equations $$x=x_1+u_a(x_2-x_1)$$

$$y=y_1+u_a(y_2-y_1)$$

or $$x=x_3+u_b(x_4-x_3)$$

$$y=y_3+u_b(y_4-y_3)$$

Thus, by substituting either $u_a$ or $u_b$, into the above, the point $P=(x, y)$, can be identified.

The intersections of two circles determines a line known as the radical line. If three circles mutually intersect in a single point, their point of intersection is the intersection of their pairwise radical lines, known as the radical center. Using the concepts described above, the trilateration algorithm that is used with the present invention can now be described. As shown above, the intersection point of the radical lines, each of which interconnects the intersection points of a pair of intersecting loci, gives the location of client 14.

The trilateration process of the present invention is now described. The initial step in the trilateration process is to determine the TOF between $AP_i$ and the client, $\Delta t_i$. This value $\Delta t_i$ is converted to a distance in meters $r_i$ by using the expression $r_i=\Delta t_i \cdot c$ meters, where c is the speed of light in meters per second. From the above, two circles, $C_0$ with center at $P_0=(x_0, y_0)$ and radius of $r_0$, and $C_1$ with center at $P_1=(x_1, y_1)$ and radius of $r_1$ will intersect if $r_0+r_1 \geq r_{01}=\sqrt{(x_0-x_1)^2+(y_0-y_1)^2}$. For each pair of intersecting circles, $c_i$ and $c_j$, $i \neq j$, (where $c_i$ is the locus of circle around $AP_i$), the radical line, $l_{ij}$, must then be determined (two pairs of circles are sufficient). The two intersection points of two non-concentric circles are given by:

$$x_{31}=x_2+h(y_1-y_0)/d \quad x_{32}=x_2-h(y_1-y_0)/d$$

and $$y_{31}=y_2-h(x_1-x_0)/d \quad y_{32}=y_2+h(x_1-x_0)/d$$

where $P_0=(x_0, y_0)$ is the center of one circle with radius $r_0$; $P_1=(x_1, y_1)$ is the center of the other circle with radius $r_1$; $P_2=(x_2, y_2)=P_0+a(P_1-P_0)/d$; $d^2=(x_1-x_0)^2+(y_1-y_0)^2$; $h=\sqrt{r_0^2-a^2}=\sqrt{(r_0+a)(r_0-a)}$; and $a=(r_0^2-r_1^2+d^2)/(2d)$. For each pair of radical lines, $l_{ij}$ and $l_{jk}$, $i \neq j \neq k$, the point of intersection must then be determined. The intersection point of two radical lines is given by:

$$x=x_1+u_a(x_2-x_1)$$

$$y=y_1+u_a(y_2-y_1)$$

where $$u_a = \frac{(x_4 - x_3)(y_1 - y_3) - (y_4 - y_3)(x_1 - x_3)}{(y_4 - y_3)(x_2 - x_1) - (x_4 - x_3)(y_2 - y_1)};$$

$(x_1, y_1)$ and $(x_2, y_2)$ are the two points of one line and $(x_3, y_3)$ and $(x_4, y_4)$ are the two points of the other line. The point of intersection determined by the above steps is the position of the client $P_c=(x_c, y_c)$.

Figure 11:
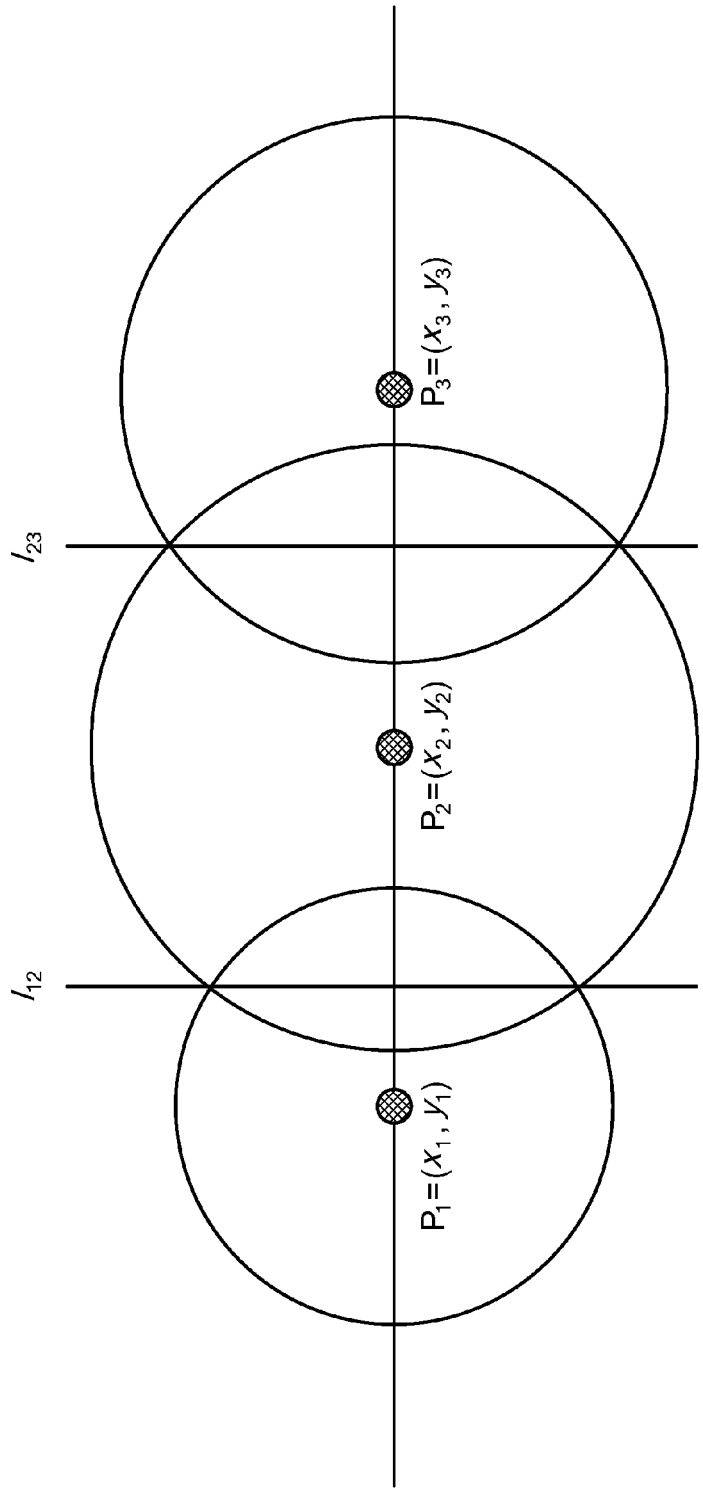
FIG. 11 illustrates three point collinearity where trilateration would also not be effective.

FIG. 11 illustrates another embodiment of the location algorithm of the present invention. Another condition that should not be used in the trilateration is when three circles have collinear centers as shown in FIG. 11. Three or more points $P_1=(x_1, y_1)$, $P_2=(x_2, y_2)$, and $P_3=(x_3, y_3)$, are said to be collinear if they lie on a single straight line L. Two points are trivially collinear since two points determine a line. Three points $P_i=(x_i, y_i)$ for i=1, 2, 3 are collinear if and only if the ratios of distances satisfy the equation $x_2-x_1:y_2-y_1=x_3-x_1:y_3-y_1$. A more tractable condition is obtained by noting that the area of a triangle determined by three points will be zero if and only if they are collinear. This includes the degenerate cases of two or all three points being concurrent), i.e., $$\begin{vmatrix} x_1 & y_1 & 1 \\ x_2 & y_2 & 1 \\ x_3 & y_3 & 1 \end{vmatrix} = 0$$

or, in expanded form, $x_1(y_2-y_3)+x_2(y_3-y_1)+x_3(y_1-y_2)=0$. The condition for three points to be collinear can also be expressed as the statement that the distance between any one point and the line determined by the other two is zero. The above properties can be used to eliminate circles with collinear centers when performing the trilateration.

Two or more lines which intersect in a point are said to "concur". Two or more lines are said to be concurrent if they intersect in a single point. Three lines $A_1x+B_1y+C_1=0$ $A_2x+B_2y+C_2=0$ $A_3x+B_3y+C_3=0$ in Cartesian coordinates are concurrent if their coefficients satisfy $$\begin{vmatrix} A_1 & B_1 & C_1 \\ A_2 & B_2 & C_2 \\ A_3 & B_3 & C_3 \end{vmatrix} = 0$$

Figure 12:
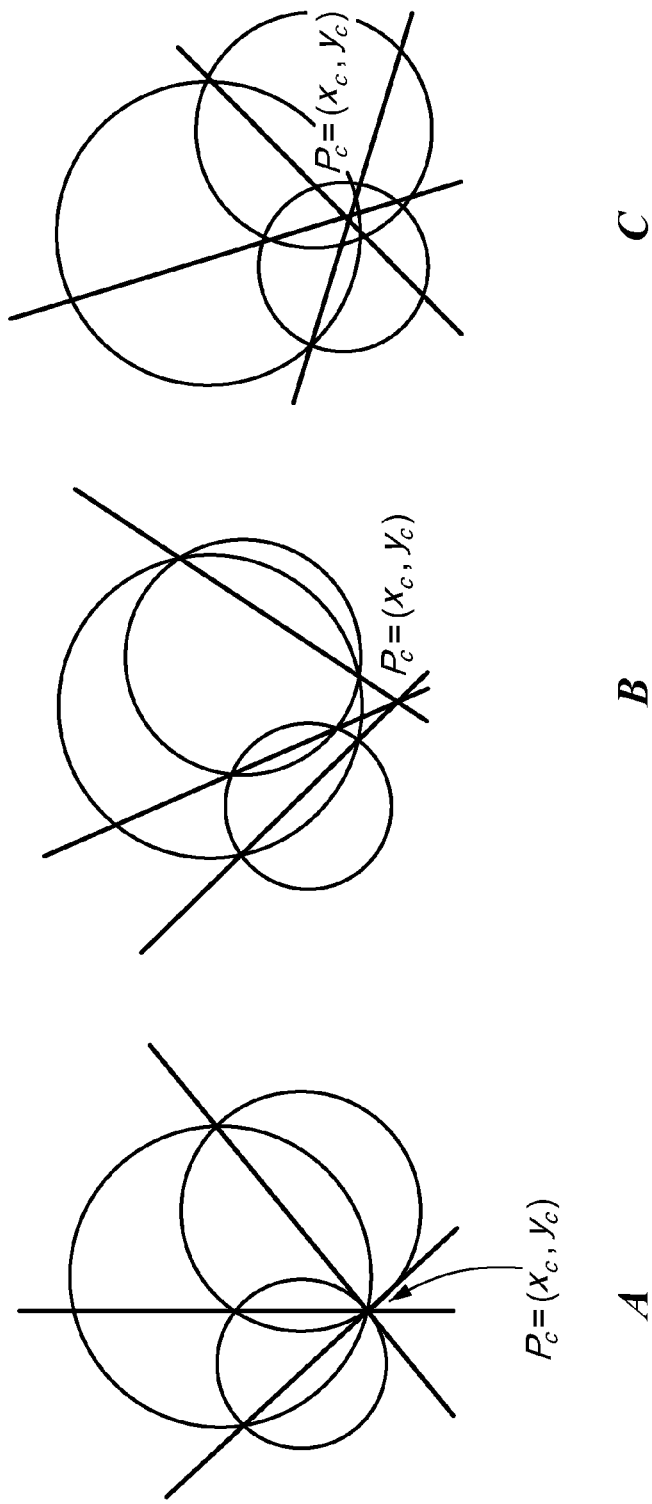
FIG. 12 illustrates examples of intersecting circle and radical line scenarios.

This property can be used in the location algorithm of the present invention as a further test in ensuring that the radical lines do intersect when determining the location of client 14. Examples of intersection scenarios are shown in FIG. 12. If the ranging process is accurate and $r_i$, i=1, 2, ..., N, are accurately determined, then scenarios a and b in FIG. 12 are unlikely to occur in the trilateration.

Another embodiment of the present invention includes median filtering. Median filtering is a non-linear digital filtering technique used to remove noise from images or other signals. It is useful in the removal of impulse noise from signals. The technique examines a sample of the input and decides if it is representative of the signal. This is performed using a window consisting of an odd number of samples. The values in the window are sorted into numerical order; the median value, the sample in the center of the window, is selected as the output. The oldest sample is discarded, a new sample acquired, and the calculation repeats. In image processing it is usually necessary to perform high degree of noise reduction in an image before performing higher-level processing steps, such as edge detection.

In the client location scenario addressed by the present invention, it is assumed that the number of APs is greater than the minimum required for trilateration (three). Particularly, with a high system redundancy, only a small number of measurements are likely to contain NLOS errors. Then, using trilateration, a number of clean intersections will exist near the true client position. In addition, the distance measurements can be group into subsets, each subset with its associated VRSs, and intermediate location estimates and SLEs derived for these subsets. Median filtering of the resulting SLEs removes aberrant data points or large impulse noise values (subsets with very large NLOS errors) while preserving mostly "clean" data point (subsets without NLOS errors). The median filter is a suitable mechanism for removing or ignoring the effects of inappropriate data points.

The accuracy of the location algorithm of the present invention depends on system redundancy, that is, the larger the number of APs, the higher the client-AP hearability and positioning accuracy. The hearability improvement through the deployment of a larger number of APs allows for the client to receive signals from a greater number of APs thereby achieving a larger number or redundant trilateration instances and VRSs. The benefits of having higher positioning accuracy out-weigh the costs of having system redundancy since the costs of APs are low and their prices continue to fall.

The intermediate client location $P_c=(x_c, y_c)$ can be correctly estimated when there are multiple clean intersections. As a result, multiple clean intersections can provide dominant intersection possibilities near the true client location. Therefore, NLOS-error mitigation capability can be achieved by the number of clean intersections and the total number of intersections. The more APs 12 used, the greater the number of intersection possibilities and, therefore, the higher the positioning accuracy. NLOS errors cannot be mitigated if the number of APs 12 is less than or equal to four because of the lack of redundancy, i.e., a minimum of three APs 12 are required for trilateration. With four APs 12, there is one VRS and three APs 12 participating in trilateration.

The location algorithm of the present invention will now be described. It is assumed that each one of the N APs has a known location, i.e., $P_i=(x_i, y_i)$, i=1, 2, ..., N. It is also assumed that the ranging between APs 12 and client 14 is complete and the N distances are obtained, $r_i$, i=1, 2, ..., N. There are N APs 12, but a minimum of 3 APs 12 are required to compute the client's location. Create L subsets of measurements are created, each of which contains three distances, i.e., $$L = \frac{N!}{3!(N-3)!}$$

The next step in the algorithm excludes subsets, if any, that cannot be used in the trilateration, leaving M subsets. For each one of the M subsets, k, the three distances are used to compute the intermediate client location $P_{k,c}=(x_{k,c}, y_{k,c})$, k=1, 2, ..., M. For each one of the M subsets, k, there are (N−3)

VRSs. For each one of the VRSs, j, in subset k, the distance and the square-of-location-error (SLE) are computed as follows:

$$SLE_{k,j} = \|g_{k,j} - r_{k,j}\|^2,$$

$$g_{k,j} = \sqrt{(x_c - x_{k,j})^2 + (y_c - y_{k,j})^2},$$

$$k=1,2,\ldots,M, j=1,2,\ldots,(N-3)$$

For each one of the M subsets, k (each with (N–3) VRSs), the median of the (N–3) SLEs (MedS) is computed. That is, for subset k:

$$MedS_k = \text{Median}[SLE_{k,j}], j=1,2,\ldots,(N-3)$$

$$k=1,2,\ldots,M$$

Then, all of the M subsets are computed, each with its MedS, and the minimum or least MedS is selected. The location that corresponds to the subset that has the minimum MedS is selected as the location of the client in this fashion:

$$l = \arg\left\{\min_k [MedS_k]\right\}, k = 1, 2, \ldots, M$$

$$P_{client} = (x_l, y_l)$$

Instead of the above step, the algorithm can be enhanced to compute the final client location based on a linear weighting of the intermediate client locations $P_{k,c} = (x_{k,c}, y_{k,c})$, k=1, 2, ..., M. With this, each intermediate estimate $P_{k,c} = (x_{k,c}, y_{k,c})$ is weighted by the inverse of its associated MedS, $MedS_k$. This means that in the computation of the final client location estimate, those intermediate estimates with lower MedS would be assigned more weight. In this fashion, the overall accuracy of the location estimate can be improved. The final estimate is then computed by the following normalized linear equation:

$$P_{client} = \begin{pmatrix} x_l \\ y_l \end{pmatrix}^T \frac{\sum_{k=1}^{M} \frac{1}{MedS_k} \begin{pmatrix} x_{k,c} \\ y_{k,c} \end{pmatrix}^T}{\sum_{k=1}^{M} \frac{1}{MedS_k}}$$

The location method of the present invention thus includes of two primary components. The first component is the derivation of the intermediate client location $P_c = (x_c, y_c)$ using trilateration. The intermediate client location is derived from TOF measurements using the ranging protocols. The second component is the identification and mitigation of NLOS errors in order to improve positioning accuracy using the median filtering of squares of location errors (SLE). Although the method uses redundancy to identify and mitigate NLOS errors, its computational burden is low. System redundancy is only explored in the derivation of the intermediate client location $P_c = (x_c, y_c)$, which is the first component of the algorithm. Furthermore, only a small amount of computation needs to be completed in the second components—NLOS-error mitigation using median filtering of SLE.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for determining a location of a client in a local area network, the local area network including one or more access points in communication with the client, the system comprising:
   a ranging subsystem configured to determine estimated distances between the client and each of the one or more access points, each of the one or more access points having a known position; and
   a positioning subsystem including a virtual reference station, the positioning subsystem being separate from the client and the one or more access points, the positioning subsystem configured to determine the location of the client utilizing:
      the estimated distances between the client and the virtual reference station, and the client and the one or more access points; and
      the known position of the virtual reference station and the one or more access points.

2. The system of claim 1, wherein the positioning subsystem includes a location management station in communication with the virtual reference station and the one or more access points over a packet network, the location management station:
   receiving, from the virtual reference station and each of the one or more access points, signals representing the estimated distances between:
      the client and the virtual reference station; and
      the client and the one or more access points; and
   determining the location of the client based upon the estimated distances.

3. The system of claim 1, wherein the virtual reference station forwards client location information.

4. The system of claim 1, wherein the ranging subsystem uses time-of-flight measurements to estimate the distance between:
   the client and the one or more access points; and
   the client and the virtual reference station.

5. The system of claim 1, wherein the positioning subsystem uses a trilateration process to determine the location of the client.

6. The system of claim 5, wherein a number of access points in the local area network is greater than a number of access points needed to perform the trilateration process.

7. The system of claim 5, wherein the virtual reference station does not participate in the trilateration process.

8. The system of claim 1, wherein the positioning subsystem utilizes median filtering of the estimated distance between the client and the one or more access points, and the client and the virtual reference station to determine the position of the client.

9. A system for determining a location of a client in a local area network, the local area network including one or more access points in communication with the client, the system comprising:
- a ranging subsystem for determining estimated distances between the client and the one or more access points, each of the one or more access points having a known position; and
- a positioning subsystem including a virtual reference station, the positioning subsystem determining the location of the client utilizing:
  - the estimated distance between the client and the virtual reference station, and the client and the one or more access points; and
  - the known position of the virtual reference station and the one or more access points,
- the positioning subsystem using a trilateration process to determine the location of the client, and the virtual reference station not participating in the trilateration process.

10. A method of determining a location of a client in a local area network, the local area network including a virtual reference station and one or more access points in communication with the client, the virtual reference station and each of the one or more access points having a predetermined position, the method comprising:
- receiving, from the virtual reference station and one or more access points, ranging protocol signals used to estimate distances from:
  - the virtual reference station to the client; and
  - each access point to the client; and
- calculating, by the virtual reference station, the location of the client based on the estimated distances and the positions of each access point, the virtual reference station being separate from the client and the one or more access points.

11. The method of claim 10, further comprising forwarding client location information.

12. The method of claim 10, further comprising using time-of-flight measurements to estimate the distances between the client and the virtual reference station, and the client and the one or more access points.

13. The method of claim 10, further comprising using a trilateration process to calculate the location of the client.

14. The method of claim 13, wherein a number of access points in the local area network is greater than a number of access points needed in the trilateration process.

15. The method of claim 13, wherein the virtual reference station does not participate in the trilateration process.

16. The method of claim 10, further comprising using median filtering of the estimated distances between the client and the virtual reference station, and the client and the one or more access points to calculate the position of the client.

17. A method of determining a location of a client in a local area network, the local area network including a virtual reference station and one or more access points in communication with the client, the virtual reference station and each of the one or more access points having a predetermined position, the method comprising:
- receiving, from the virtual reference station and one or more access points, ranging protocol signals used to estimated distances from:
  - the virtual reference station to the client; and
  - each access point to the client;
- calculating the location of the client based on the estimated distances and the position of each access point; and
- using a trilateration process to calculate the location of the client, the virtual reference station not participating in the trilateration process.

18. A location management station for determining a location of a client in a local area network having a virtual reference station and one or more access points, the virtual reference station and each of the one or more access points having a predetermined position, the location management station being separate from the client and the one or more access points, the location management station comprising:
- an interface module adapted to receive, from the virtual reference station and the one or more access points, signals representing estimated distances from the virtual reference station to the client and from each access point to the client; and
- a processor adapted to calculate the location of the client based on:
  - the estimated distances from the virtual reference station to the client, and each access point to the client; and
  - the position of the virtual reference station and each access point.

19. The location management station of claim 18, wherein upon a request from an external entity, the location management station calculates the location of the client and forwards client location information to the requesting external entity.

20. The location management station of claim 18, wherein the processor uses a trilateration process to determine the location of the client.

21. The location management station of claim 20, wherein the virtual reference station does not participate in the trilateration process.

22. The location management station of claim 18, wherein the estimated distances from each access point to the client is determined by a two-way ranging protocol.

23. A location management station for determining a location of a client in a local area network having a virtual reference station and one or more access points, the virtual reference station and each of the one or more access points having a predetermined position, the station comprising:
- an interface module adapted to receive, from the virtual reference station and the one or more access points, signals representing estimated distances from the virtual reference station and each access point to the client; and
- a processor for calculating the location of the client based on:
  - the estimated distances from the virtual reference station to the client, and each access point to the client; and
  - the position of the virtual reference station and each access point,
- the processor using a trilateration process to determine the location of the client, the virtual reference station not participating in the trilateration process.

* * * * *